Sept. 30, 1958 R. V. ANDERSON 2,854,635

VIDEO MODULATOR

Filed June 21, 1956 2 Sheets-Sheet 1

INVENTOR.
ROBERT V. ANDERSON

BY H. S. Mackey

ATTORNEY

Sept. 30, 1958 R. V. ANDERSON 2,854,635
VIDEO MODULATOR
Filed June 21, 1956 2 Sheets-Sheet 2
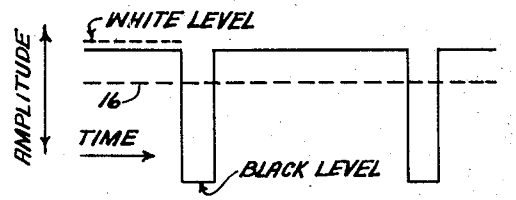
FIG-2A FIG-2B
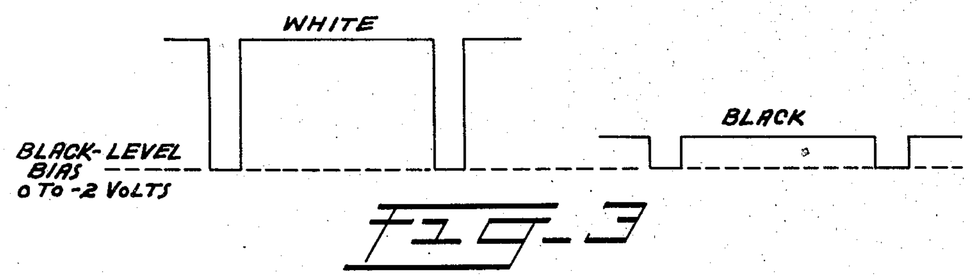
FIG-3
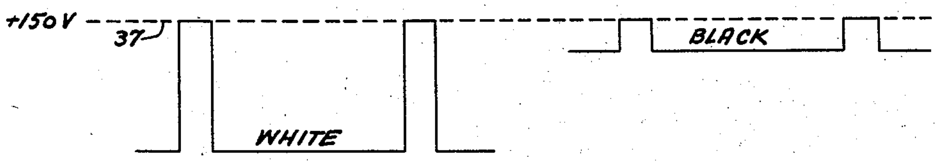
FIG-4
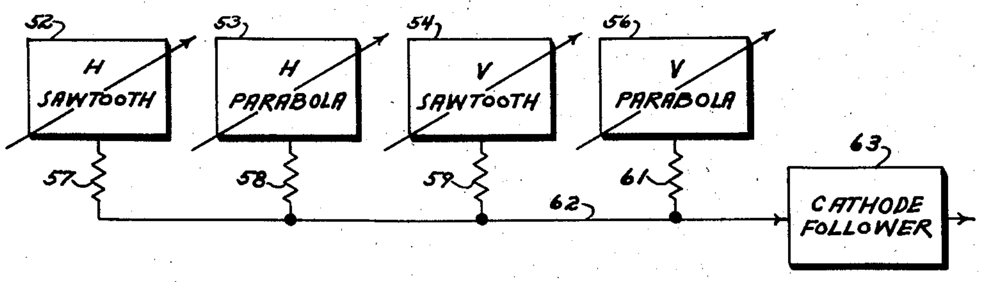
FIG-5
INVENTOR.
ROBERT V. ANDERSON
BY [signature]
ATTORNEY

United States Patent Office 2,854,635

Patented Sept. 30, 1958

2,854,635

VIDEO MODULATOR

Robert V. Anderson, Pleasantville, N. Y., assignor to General Precision Laboratory Incorporated, a corporation of New York Application June 21, 1956, Serial No. 592,769

2 Claims. (Cl. 332—60)

This invention relates to video shading modulator circuits and particularly to such circuits designed for association with television cameras.

In general a television camera tube contains a light-sensitive surface which is scanned by an electron beam. In such a tube the ratio of the current generated at the light-sensitive surface to the intensity of the light impinging thereon often is not constant at all points of the surface. The resulting television signal then contains shadings over its area which do not exist in the original object.

This fault, which exists to some degree in all camera tubes of this class, can be corrected by introducing a shading signal which is the inverse of the shading fault, thus cancelling it. The correction signal must be introduced in the proper manner, depending upon the type of camera tube. For example, one type requires the correcting signal to be added, while another type, including television camera tubes having a photo-conductive surface, requires introduction by multiplication. This invention is restricted, in television use, to employment with camera tubes requiring shading correction by product modulation.

This invention provides simple means of multiplying the video signal by the correction signal, while at the same time preserving the required form of signal, particularly the direct-current level. The invention does this by applying the modulating signal to an electronic amplifying stage in such a way that the stage gain is varied in direct accordance with variations in the modulating signal. The video signal which is to be modulated is applied to the stage input terminals and the modulated and amplified video signal is secured from the stage output terminals.

The modulating signal may have any form, and is so generated in each case that it cancels the existing individual fault. It is therefore desirable that the modulating function generator be provided with adjustments. It has been found that simple functions, such as sawtooth and parabolic functions, and combinations of them, are all that are required in most cases.

The fault in the video input signal is usually such as to produce spots, rather than bands, of incorrect shading in the video picture. In general therefore, both horizontal scan and vertical scan correction signals are required, and are applied simultaneously by the circuit arrangement of this invention. However, the invention is equally useful in correcting either a horizontal scan fault alone or a vertical scan fault alone.

Although this invention is peculiarly adapted to the correction of either black-and-white or color video signals from television picture tubes such as photo-sensitive tubes by a multiplication process which does not interfere with the direct-current level of the signal, the invention may also be applied to non-television signals and to signals having other frequency ranges.

The general purpose of this invention is to provide an electronic circuit for multiplying one signal by another signal by varying the gain of an amplifying stage.

The principal purpose of this invention is to provide a video modulating circuit means for correcting shading faults in the output signal of television camera tubes of the photo-conductive kind.

A more specific purpose is to multiply two signals by applying one to a grid of an electronic amplifier stage and applying the other to change the gain of the stage.

A still more specific purpose is to vary the gain of an electronic tube amplifier stage without substantial change of its anode current or anode potential.

A further understanding of this invention may be secured from the detailed description and associated drawings, in which:

Figures 2A, 2B, 3 and 4 are graphs of modulator video potential wave forms.

Figure 5 is a partly functional diagram of an electrical waveform generator.

Figure 1:
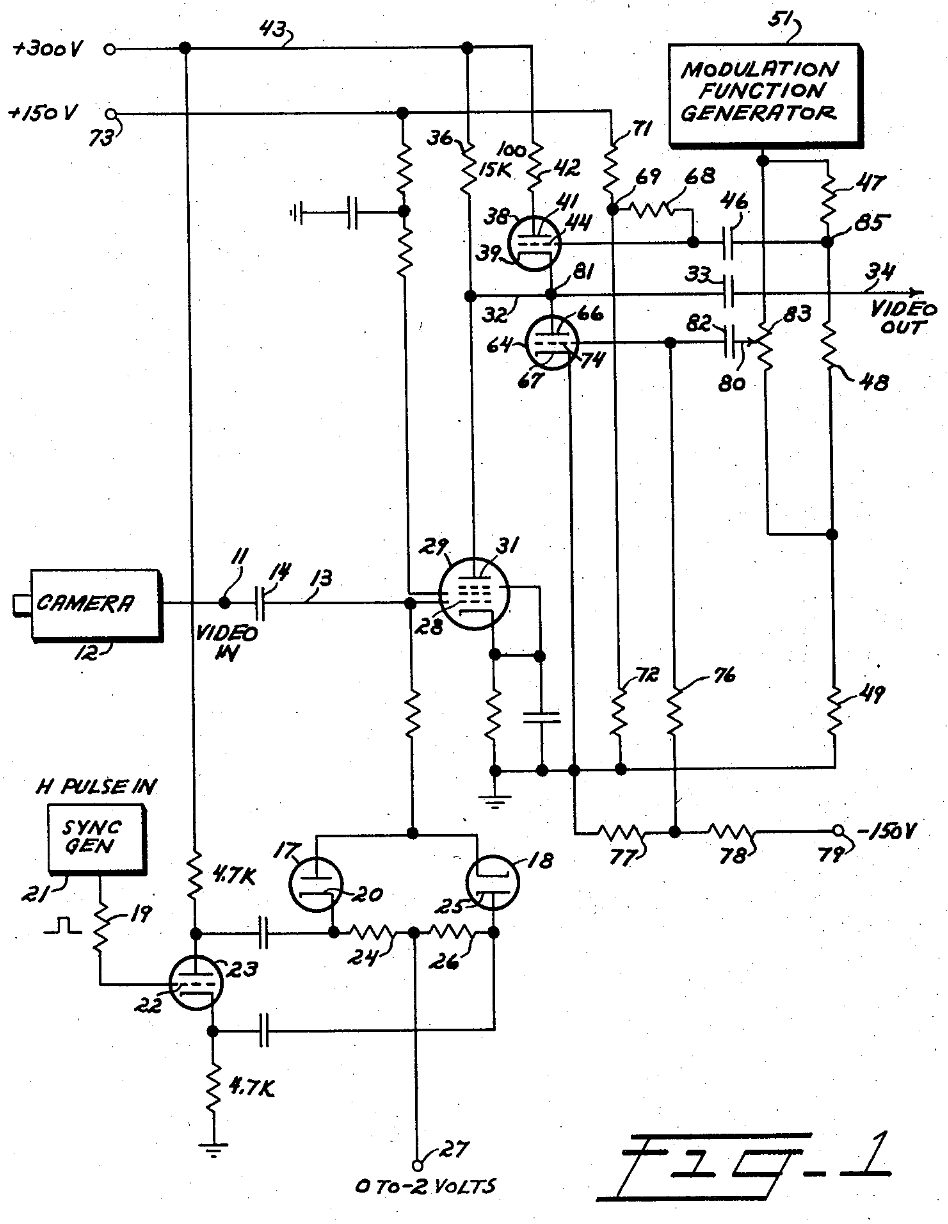
Figure 1 is a schematic wiring diagram of an embodiment of the invention.

Referring now to Fig. 1, an electrical television signal is applied to terminal 11 from a television camera 12. This camera contains a camera tube of the photo-conductive type, and emits a signal in the video range of zero to seven, or more, mcps. This signal may have an amplitude at any point which represents some shade of gray in a black and white picture between white and black. In color depiction it may represent any intensity of one of the primary colors, such as red. Such a signal representing in black-and-white a uniform nearly white level will be, without clamping, as depicted in Fig. 2A. A nearly completely black signal would be represented as in Fig. 2B. These signals have no direct-current component because of the blocking condenser 14, Fig. 1, and the potential average is indicated by the dashed line 16, Figs. 2A and 2B.

In order to bring the black level amplitude to a selected and constant potential relative to ground, clamping diode tubes 17 and 18, Fig. 1 are employed. These tubes are made conductive by rectangular pulses at the horizontal synchronizing pulse rate and phase. The pulses are secured through resistor 19 from the horizontal synchronization signal generator of the television transmitter, which is indicated by rectangle 21. These positive pulses are applied to the control grid 22 of a triode 23 connected as a phase splitter. The output negative pulses are applied to the cathode 20 of diode 17, making it conductive for their duration, and the output positive pulses are applied to the anode 25 of diode 18, likewise making it conductive for their duration. The cathode 20 and anode 25 are also connected through equal resistors 24 and 26 to a bias terminal 27 which is connected to a source of direct potential adjustable between −1. and −4.5 volts. Thus during the pulse interval whether the potential of conductor 13 tends to be above or below the bias value, the conductor is clamped during that time to the bias value. All signal pedestals are therefore clamped to black level bias as indicated in Fig. 3.

Conductor 13, Fig. 1, is connected to the first grid 28 of a pentode 29, from the anode 31 of which the output video signal is taken through conductor 32, blocking capacitor 33 and conductor 34. The anode 31 of pentode 29 is conventionally supplied with direct potential at +300 volts through an anode load resistor 36 of 15,000 ohms resistance. This load may more generally be considered as an impedance. The amplification or gain of this pentode stage is $$A = g_m R_{eq} \qquad (1)$$

in which A is the amplification, $g_m$ is the mutual conductance or first grid-anode transconductance, and $R_{eq}$ is the equivalent resistance or impedance of all paths connected to the anode 31. Signals applied to the control grid 28 are inverted and if small are linearly amplified, so that the anode potentials corresponding to the grid signals of Fig. 3 are as shown in Fig. 4. The transconductance, $g_m$, remains substantially constant in small-signal operation.

In this kind of television signal operation, multiplication of the first grid signal by a modulating signal cannot be effected by the conventional method of employing the modulating signal to change the bias or voltage of the first or third grid, for the reason that this would effectively vary the anode current and the level of the dashed line 37. This would destroy the black level clamping. In place of this conventional grid bias multiplication method, this invention varies the effective anode load resistance $R_{eq}$ in accordance with the modulating signal, thus varying the stage gain without changing either the anode voltage or the anode current.

This is effected by shunting resistor 36, Fig. 1, by a resistance or impedance triode 38. Its cathode 39 is connected to anode 31, and the triode anode 41 is connected through a 100-ohm parasitic-suppressing resistor 42 to the 300-volt direct-current supply conductor 43 which supplies pentode 29. The control grid 44 is connected through a blocking capacitor 46 and through voltage divider resistors 47, 48 and 49 to a function generator 51 which supplies a modulating signal. The effect of thus connecting triode 38 is that its cathode resistance as "seen" by the pentode 29 is effectively in shunt with the load resistor 36, so that the equivalent resistance $R_{eq}$ is their total shunt resistance. Since the cathode resistance of triode 38, which is the reciprocal of the transconductance or $$R_1=\frac{1}{g_m} \qquad (2)$$

is much less than the resistance of resistor 36, variation of the stage gain is almost linearly proportional to the variation of the cathode resistance of triode 38. Variations of the potential betwen grid 44 and cathode 39 vary the cathode resistance.

The function generator 51 may generate any desired electrical waveform, but for television purposes simple forms are usually all that are required. In this example the generator 51 generates only sawtooth and parabolic forms. The forms may be of either polarity, and have a period equal to that of either the horizontal scan or the vertical scan. One satisfactory design of function generator is indicated in Fig. 5. It includes sawtooth and parabolic generators 52 and 53 having periods eqaul to the horizontal scan period, and sawtooth and parabolic generators 54 and 56 having vertical scan periods. Each generator is manually adjustable in both amplitude and phase sense, and all outputs are connected through decoupling resistors 57, 58, 59 and 61 to a common conductor 62. The output is taken from a cathode follower stage 63. This output has a potential which is at any instant representative of the algebraic sum of the potentials of the four generators 52, 53, 54 and 56.

As so far described, omitting use of triode 64, Fig. 1, variation of the equivalent pentode anode load resistance would vary the potential applied to anode 31, and consequently would vary the anode 31 current and the potential applied to output capacitor 33 and to the output conductor 34. These potential variations consequently would introduce an additive component in addition to the desired product modulation.

Elimination of this undesired additive component is effected by the triode 64. This triode is preferably identical with triode 38, and is connected in series therewith, anode 66 being connected to cathode 39 and cathode 67 being connected to ground. Grid 74 is connected through capacitor 82 to the slider 80 of a potentiometer

83. This potentiometer 83 is connected in shunt with the potentiometer consisting of resistors 47 and 48, so that by adjustment of slider 80 small differences in tubes 38 and 64 may be compensated.

The grids 44 and 74 are given such fixed biases as to cause equal quiescent currents to flow in each of the triodes 38 and 64. Grid 44 is connected through resistor 68 to the tap 69 of a voltage divider consisting of resistors 71 and 72 connected between +150-volt supply terminal 73 and ground. Resistor values are such that the grid bias is of such amount below +150 volts that at a selected anode current the cathode 39 potential is +150 volts. Grid 74 is biased by connection through resistors 76, 77 and 78 to a negative 150-volt terminal 79, so that grid 74 is biased to the same amount below ground that grid 44 is biased below +150 volts. Thus the same selected anode current is made to flow in triode 64 that flows in triode 38. Since these triodes are identical and have identical currents, their midpoint 81 is held constant at one-half the +300-volt potential of conductor 43, or at +150 volts.

The triodes 38 and 64, being connected in tandem and having substantially equal signals impressed on their grids, have equal currents flowing at all times and there is never any tendency for the potential of midpoint 81 to depart from +150 volts. Thus 150 volts is always impressed on the pentode anode 31, and the only variation in pentode anode voltage that can occur is that due to the signal on the pentode control grid 28, and additive change by the modulating signal cannot occur.

What is claimed is:

1. A modulator comprising, a first electronic tube having at least an anode, cathode and grid, a second electronic tube having at least an anode, cathode and grid, a third electronic tube having at least an anode, cathode and grid, a load resistor having one terminal connected to the anodes of said first and third tubes and to the cathode of said second tube, means connecting the cathodes of said first and third tubes to ground, means connecting the other terminal of said resistor and the anode of said second tube to a source of positive potential, an electronic clamp circuit intermittently fixing the potential of a grid of said first tube at a selected potential, means applying an input video signal to be modulated to said last-named grid, means applying an input modulating signal to grids of said second and third tubes, means securing a selected static current passing through the anodes of said second and third tubes resulting in a selected potential at the third tube anode, and means securing a modulated signal representing only the product of said two input signals from said first tube anode.

2. A television modulator comprising, a first electronic tube having at least an anode, cathode and grid, a second electronic tube having at least an anode, cathode and grid, a third electronic tube having at least an anode, cathode and grid, a load resistor having one terminal connected to the anodes of said first and third tubes and to the cathode of said second tube, means connecting the cathodes of said first and third tubes to ground, means connecting the other terminal of said load resistor and the anode of said second tube to a source of positive potential, a synchronization signal generator generating a synchronization signal having a selected frequency, an electronic clamp circuit connected to said first electronic tube grid, said electronic clamp circuit being connected to said synchronization signal generator for actuation during the signal therefrom to clamp said first tube grid to a selected clamp potential, means applying an input television video signal to be modulated to said first tube grid, said signal having black level pedestals recurrent at said selected frequency, means generating a cyclic function modulating signal having said selected frequency, means applying said modulating signal to the grids of said second and third tubes at equal voltage amplitudes, means securing a selected static current passing through the anodes of said second and third tubes resulting in a selected potential at the first and third tube anodes, said selected potential being unaffected by variations of the modulating signal, and means securing from said first tube anode a modulated signal representing only the product of said two input signals.

References Cited in the file of this patent

UNITED STATES PATENTS

| | | |
|---|---|---|
| 2,120,800 | Ditcham | June 14, 1938 |
| 2,794,077 | Olson | May 28, 1957 |